United States Patent
Comte et al.

(10) Patent No.: US 11,352,290 B2
(45) Date of Patent: Jun. 7, 2022

(54) TRANSPARENT β-QUARTZ GLASS-CERAMICS WITH LOW LITHIUM CONTENT

(71) Applicant: Eurokera, Jouarre (FR)

(72) Inventors: Marie Comte, Fontenay aux Roses (FR); Thiphaine Ogier, Paris (FR); Philippe Lehuede, Dammarie les Lys (FR)

(73) Assignee: EUROKERA, Jouarre (FR)

( * ) Notice: Subject to any disclaimer, the term of this patent is extended or adjusted under 35 U.S.C. 154(b) by 0 days.

(21) Appl. No.: 16/620,307

(22) PCT Filed: Jun. 6, 2018

(86) PCT No.: PCT/EP2018/064909
§ 371 (c)(1),
(2) Date: Dec. 6, 2019

(87) PCT Pub. No.: WO2018/224554
PCT Pub. Date: Dec. 13, 2018

(65) Prior Publication Data
US 2020/0189965 A1 Jun. 18, 2020

(30) Foreign Application Priority Data
Jun. 7, 2017 (FR) ..................... 1755049

(51) Int. Cl.
| | | |
|---|---|---|
| C03C 10/00 | (2006.01) | |
| C03C 4/02 | (2006.01) | |
| C03C 1/04 | (2006.01) | |
| C03C 3/087 | (2006.01) | |
| C03C 3/085 | (2006.01) | |
| C03B 32/02 | (2006.01) | |

(52) U.S. Cl.
CPC ............ *C03C 10/0009* (2013.01); *C03C 1/04* (2013.01); *C03C 3/085* (2013.01); *C03C 3/087* (2013.01); *C03C 4/02* (2013.01); *C03B 32/02* (2013.01); *C03C 2204/00* (2013.01)

(58) Field of Classification Search
CPC ....... C03C 10/0009; C03C 1/04; C03C 3/085; C03C 3/087; C03C 4/02; C03C 2204/00; C03C 10/0027; C03C 10/0045; C03B 32/02
See application file for complete search history.

(56) References Cited

U.S. PATENT DOCUMENTS

| | | | |
|---|---|---|---|
| 9,018,113 B2 | 4/2015 | Siebers et al. | |
| 2008/0207424 A1* | 8/2008 | Aitken | ...................... C03C 4/10 501/10 |
| 2017/0050880 A1* | 2/2017 | Plevacova | ............... C03B 32/02 |
| 2018/0202666 A1* | 7/2018 | Mueller | .................. C03C 17/00 |

FOREIGN PATENT DOCUMENTS

| | | |
|---|---|---|
| CN | 104350017 A | 2/2015 |
| CN | 104936914 A | 9/2015 |
| FR | 2887871 A1 | 1/2007 |
| FR | 30200359 A1 | 10/2015 |
| JP | 2006-330010 A | 12/2006 |
| WO | WO2005010574 A1 | 2/2005 |

OTHER PUBLICATIONS

International Search Report & Written Opinion relating to International Application No. PCT/EP2018/064909.
China First Office Action issued in China Application No. 201880038161.6 dated Oct. 21, 2021.

* cited by examiner

*Primary Examiner* — Karl E Group
*Assistant Examiner* — Cameron K Miller
(74) *Attorney, Agent, or Firm* — Dinsmore & Shohl LLP

(57) ABSTRACT

The present application provides transparent glass-ceramics of β-quartz of composition containing a small content of lithium, articles constituted at least in part of said glass-ceramics, glasses precursors of said glass-ceramics, and also a method of preparing said articles. Said glass-ceramics have a composition, free of arsenic oxide and antimony oxide, except for inevitable traces, expressed as percentages by weight of oxides, containing: 62% to 68% of $SiO_2$; 17% to 21% of $Al_2O_3$; 1% to <2% of $Li_2O$; 1% to 4% of MgO; 1% to 6% of ZnO; 0 to 4% of BaO; 0 to 4% of SrO; 0 to 1% of CaO; 1% to 5% of $TiO_2$; 0 to 2% of $ZrO_2$; 0 to 1% of $Na_2O$; 0 to 1% of $K_2O$; with $Na_2O+K_2O+BaO+SrO+CaO<6\%$; optionally up to 2% of at least one fining agent comprising $SnO_2$; and optionally up to 2% of at least one coloring agent.

16 Claims, No Drawings

TRANSPARENT β-QUARTZ GLASS-CERAMICS WITH LOW LITHIUM CONTENT

CROSS-REFERENCE TO RELATED APPLICATIONS

This application claims the benefit of priority under 35 U.S.C § 365 of International Patent Application Serial No. PCT/EP2018/064909 filed on Jun. 6, 2018 designating the United States of America, the content of which is relied upon and incorporated herein by reference in its entirety, which in turn claims the benefit of priority under 35 U.S.C. § 119 of French Patent Application Serial No. 1755049 filed on Jun. 7, 2017, the content of which is relied upon and incorporated herein by reference in its entirety.

The context of the present application is that of transparent low expansion glass-ceramics containing a solid solution of β-quartz as the main crystalline phase. The present application relates more particularly to:

transparent glass-ceramics containing a solid solution of β-quartz as the main crystalline phase and a composition with a low lithium content;
articles constituted at least in part of these glass-ceramics;
aluminosilicate glasses, precursors of these glass-ceramics; and
a method of preparing these articles.

Transparent glass-ceramics of the lithium aluminosilicate (LAS) type containing a solid solution of β-quartz as the main crystalline phase have been in existence for more than 20 years. They are described in numerous patent documents and in particular in U.S. Pat. No. 5,070,045 and patent application WO 2012/156444. They are used in particular appliances as the material for constituting cooktops, cooking utensils, microwave oven plates, fireplace windows, fireplace inserts, stove windows, oven doors (in particular for pyrolytic and catalytic oven), and fire-windows.

In order to obtain such glass-ceramics (and more precisely in order to eliminate inclusions of gas within the precursor molten glass), conventional fining agents, $As_2O_3$ and/or $Sb_2O_3$, have been in use for a long time. Given the toxicity of these two elements and the ever more severe regulations that are in force, it is desirable to avoid using these (toxic) fining agents in the fabrication of the precursor glass. $SnO_2$ has been proposed as a substitute fining agent (see in particular the teaching of patent documents U.S. Pat. Nos. 6,846,760, 8,053,381, and WO 2012/156444). It is being used more and more. Nevertheless, at a similar fining temperature, it is found to be less effective than $As_2O_3$. In general manner, and particularly in the context of using $SnO_2$ as a fining agent, in order to facilitate fining, it is advantageous to have (precursor) glasses that have low viscosities at high temperature.

Depending on the heating means that are associated with cooktops used (radiant heating means or induction heating means), requirements concerning values for the (linear) coefficient of thermal expansion (CTE) of the material constituting said cooktops are more or less constraining. Cooktops used with radiant heaters may be raised to temperatures as high as 725° C., and in order to withstand the thermal shocks and the thermal gradients that can arise in the cooktop, they have a CTE that generally lies in the range $-10 \cdot 10^{-7}$ per Kelvin ($K^{-1}$) to $+10 \cdot 10^{-7} K^{-1}$. Cooktops used with induction heaters are subjected to lower temperatures (at most about 400° C.). A new generation of inductors, using infrared sensors, has also recently appeared. Those sensors make it possible for the temperature of the cooktops to be better controlled and not to exceed 300° C. Cooktops used with induction heaters are therefore subjected to thermal shocks that are less violent; the CTE of said cooktops can therefore be greater.

For reasons of appearance, it is also desirable for a cooktop, even when transparent, to mask the elements that are placed beneath it, such as induction coils, electric wiring, and circuits for controlling and monitoring the cooking appliance. An opacifier may be deposited on the bottom face of such a cooktop or the material from which it is constituted may be strongly colored. If colored, some minimum level of transmission must nevertheless be conserved so that displays can be seen, e.g. as a result of light emitted by light-emitting diodes (LEDs) placed under the plate.

Lithium is one of the main ingredients of glass-ceramics (of the lithium aluminosilicate (LAS) type containing a solid solution of β-quartz as the main crystalline phase). At present, lithium is present in the composition of said glass-ceramics, generally at contents lying in the range 2.5% to 4.5%, and more generally contents in the range 3.6% to 4.0% by weight (expressed in terms of $Li_2O$), essentially as an ingredient of the solid solution of β-quartz and as a flux for the glass. At present, the supply of lithium is less reliable than it used to be. In any event, this element is becoming more expensive. The reason for this recent pressure on the availability and the price of lithium lies in the increasing demand for lithium for producing lithium batteries.

The inventors have thus sought glass-ceramic compositions that show high performance with a low lithium content. As a result of their research, they have found compositions with lithium contents that are considerably reduced compared with those of existing glass-ceramics (see below).

The prior art already describes glasses and glass-ceramics having compositions with various low contents of lithium. Thus:

from aluminosilicate glasses that do not contain lithium but rather a high content of zinc, it is known that it is possible to obtain glass-ceramics containing a β-quartz solid solution as the main crystalline phase. Nevertheless, such glass-ceramics are not transparent (they are opaque), their precursor glasses have low viscosity at the liquidus temperature, and the heat treatments required for crystallizing (ceramming) said precursor glasses in order to obtain said glass-ceramics are lengthy (see the book "Glass-ceramic technology", $2^{nd}$ edition, by W. Hölland and G. H. Beall, pp. 116-117 (Wiley 2012));

patent application US 2016/0174301 describes glasses having low CTE values ($CTE_{20\text{-}300° C.} < 30 \cdot 10^{-7} K^{-1}$), that can be suitable material for making induction cooktops. Said glasses do not contain alkalis in their composition. Consequently, they are rather difficult to melt: firstly, they have high viscosities at high temperature, and secondly they have high electrical resistivities, so that very high voltages are needed to work them in an electrically heated oven. Such glasses may be colored by oxides of transition element, but the presence of such coloring agents in those glasses can hinder melting them, by absorbing infrared radiation;

patent application WO 2005/010574 discloses optical devices comprising microlenses. A part of the devices is made of a crystallized glass, the disclosed composition of which is broad. The CTE considered is CTE from −40 to 80° C. The teaching of said prior art document lies in a context far from the one of the present application;

patent application WO 2015/166183 (corresponding to patent application FR 3 020 359) describes partially crystallized glass plates that are optionally transparent and preferably not colored having $CTE_{20-300°\ C.}$ values lying in the range $20 \cdot 10^{-7}K^{-1}$ to $40 \cdot 10^{-7}K^{-1}$. That document does not contain data showing that it is possible to obtain materials having both the indicated compositions and $CTE_{20-300°\ C.}$ values that are lower than $20 \cdot 10^{-7}K^{-1}$; neither does that document contain any data about high-temperature viscosity. The compositions disclosed are very broad; they may contain 1% to 2%, advantageously 1.2% to 1.8%, preferably at most 1.5% by weight of $Li_2O$;

U.S. Pat. No. 9,446,982 describes colored transparent glass-ceramics containing a solid solution of β-quartz as the main crystalline phase and having lithium contents (expressed as $Li_2O$) in the range 2% to less than 3% by weight (at least 2% by weight, with reference to controlling crystallization). For the glass-ceramics described, and with reference to the technical problem of making said glass-ceramics compatible with them being decorated, it is desired to obtain $CTE_{ambient\ temperature-700°\ C.}$ values in the range $10 \cdot 10^{-7}K^{-1}$ to $25 \cdot 10^{-7}K^{-1}$;

patent application US 2013/0085058 addresses fining glasses that are precursors of lithium aluminosilicate (LAS) type glass-ceramics, and more specifically avoiding reboiling within such glasses (the only properties specified in the examples relate to suitability for fining). Said glasses do not have more than 10 parts per million (ppm) of sulfur (S) in their composition. Their composition, which is free of $As_2O_3$ and of $Sb_2O_3$, may have 1% to 6% of $Li_2O$. It does not contain coloring elements. The compositions exemplified do not have ZnO, and for the most part they have high contents of $Li_2O$ (3.5% and 4% by weight);

patent application EP 1 170 262 describes transparent glass-ceramics of the lithium aluminosilicate (LAS) type suitable for use as an optical waveguide element. The compositions specified are broad; most of the example compositions have high contents of $Li_2O$ and of $Al_2O_3$, together with low contents of $SiO_2$; and U.S. Pat. No. 9,018,113 describes colored transparent glass-ceramics usable as cooktops associated with induction heating. Their composition has 1.5% to 4.2% of $Li_2O$; the compositions exemplified have high contents of $Li_2O$ (>2.9% by weight). No data is given about the high-temperature viscosity of the precursor glasses.

In such a context, the inventors have investigated the potential existence of transparent glass-ceramics, the composition of which has a low lithium content (less than 2% by weight of $Li_2O$ (see below)) and that are entirely suitable for use as the material for making cooktops in a context of induction heating, and more particularly in a context of induction heating using infrared sensors for controlling heating (it is mentioned above that the maximum temperature reached by a cooktop in operation is about 400° C. (for induction heating in general) and does not exceed 300° C. (for induction heating with infrared sensors)). Such glass-ceramics need to satisfy the following specifications:

being transparent (even if they are usually highly colored): at the intended utilization thickness (plates typically 1 millimeter (mm) to 8 mm thick, more generally 2 mm to 5 mm thick, and often 4 mm thick), said glass-ceramics need to have integrated transmission, TL (%) equal to or greater than 1% and a diffusion percentage less than 2%. Transmission measurements may be performed using a spectrometer having an integrating sphere, by way of example. On the basis of these measurements, the integrated transmission (TL (%)) in the visible range (between 380 and 780 nm) and the diffusion percentage (Diffusion (%)) are calculated using the standard ASTM D 1003-13 (under D65 illuminant with 2° observer);

having a $CTE_{25-300°\ C.}$ lying in the range $+/-25 \cdot 10^{-7}K^{-1}$ ($-25 \cdot 10^{-7}K^{-1} \leq CTE \leq +25 \cdot 10^{-7}K^{1}$) and preferably in the range $+/-20 \cdot 10^{-7}K^{-1}$ ($-20 \cdot 10^{-7}K^{-1} \leq CTE \leq +20 \cdot 10^{-7}K^{-1}$), so as to be acceptable for use with induction heater means, and more particularly induction heater means associated with infrared sensors (it has to be understood that said CTE is inferior or equal to $+25 \cdot 10^{-7}K^{-1}$, advantageously inferior or equal to $+20 \cdot 10^{-7}K^{-1}$, in the spirit of what has been specified above about the teaching of the prior art), and having a precursor glass that possesses advantageous properties, even the same advantageous properties as the precursor glasses for prior art glass-ceramics containing a higher content of $Li_2O$; i.e.:

said precursor glass must have a low liquidus temperature (<1400° C.) and a high viscosity at the liquidus (greater than 200 Pa·s, indeed greater than 400 Pa·s, preferably greater than 500 Pa·s), thereby facilitating forming; and/or, advantageously, and said precursor glass must possess a low viscosity at high temperature ($T_{30\ Pa \cdot s} < 1640°$ C.), thereby facilitating fining.

In other respects it is highly appreciated for said precursor glass to be capable of being transformed into glass-ceramic in a short length of time (<3 hours (h)), and preferably in a very short length of time (<1 h), and/or, advantageously and, to also have an electrical resistivity, at a viscosity of 30 pascal seconds (Pa·s), of less than 50 ohm centimeters (Ω·cm) (preferably less than 20 Ω·cm). The man skilled in the art will understand (in view of the composition of the glass-ceramics below stated) that obtaining these two last properties, which are opportunely required for the precursor glass, raises no particular difficulty.

It is also particularly interesting for the transparent glass-ceramics aimed to have their composition free of $As_2O_3$ and $Sb_2O_3$ (except for inevitable traces).

The inventors have established that such glass-ceramics exist with a composition that therefore contains little lithium (less than 2% by weight of $Li_2O$) and that satisfies the above specifications. Said glass-ceramics constitute the first aspect of the present application. In characteristic manner, these glass-ceramics have the following composition, free of arsenic oxide and antimony oxide, except for inevitable traces, expressed in percentages by weight of oxides:

62% to 68% of $SiO_2$;
17% to 21% of $Al_2O_3$;
1% to <2% of $Li_2O$;
1% to 4% of MgO;
1% to 6% of ZnO;
0 to 4% of BaO;
0 to 4% of SrO;
0 to 1% of CaO;
1% to 5% of $TiO_2$;
0 to 2% of $ZrO_2$;
0 to 1% of $Na_2O$;
0 to 1% of $K_2O$;
with $Na_2O + K_2O + BaO + SrO + CaO \leq 6\%$;
optionally up to 2% of at least one fining agent comprising $SnO_2$; and
optionally up to 2% of at least one coloring agent.

The following may be specified concerning each of the ingredients involved (or potentially involved) in the above-specified composition at the specified contents (the extreme values of each of the ranges specified (above and below) being included in said ranges).

$SiO_2$ (62%-68%): the content of $SiO_2$ (≥62%) must be suitable for obtaining a precursor glass that is sufficiently viscous to limit problems of devitrification. The content of $SiO_2$ is limited to 68% insofar as the greater the content of $SiO_2$, the greater the high-temperature viscosity of the glass, and thus the glass is more difficult to melt.

$Al_2O_3$ (17%-21%): the presence of ZnO and of MgO at the specified (rather large) quantities makes it critical to control the content of $Al_2O_3$ in order to limit devitrification phenomena. Excessive quantities of $Al_2O_3$ (>21%) make the composition more likely to devitrify (into mullite crystals or others) (see comparative example 15), which is not desirable. Conversely, quantities of $Al_2O_3$ that are too small (<17%) are unfavorable to nucleation and to the formation of small β-quartz crystallites. An $Al_2O_3$ content in the range 17.5% to 19% (bounds included) is advantageous.

$Li_2O$ (1% to <2%): the inventors have found that it is possible to obtain glass-ceramics satisfying the requirements of the above specifications while limiting the content of $Li_2O$ to less than 2% (and thus substantially limiting said content). Said content is advantageously at most 1.9% (≤1.9%). The minimum quantity of 1% is nevertheless necessary in order to obtain a material that is transparent, to keep a low high-temperature viscosity, and to keep satisfactory devitrification characteristics. This minimum quantity is advantageously 1.5%. Thus, a $Li_2O$ content in the range 1.5% to 1.9% (bounds included) is most particularly preferred.

MgO (1% to 4%) and ZnO (1% to 6%): the inventors have obtained the looked-for result by making joint use of these two elements, in the specified quantities, as partial substitutes for $Li_2O$ (present from 1% to less than 2%).

MgO: this element decreases high-temperature viscosity. It forms part of the solid solution of β-quartz. It has less impact on devitrification than ZnO (see below), but it greatly increases the CTE of the glass-ceramics (see comparative example 18). That is why its content should lie in the range 1% to 4%, advantageously in the range 1% to 3%.

ZnO: this element also serves to reduce the high-temperature viscosity of the glass and also forms part of the solid solution of β-quartz. Compared with $Li_2O$, it increases the CTE of the glass-ceramic, but it does so only moderately, thus making it possible to obtain glass-ceramics with CTE values less than $25 \cdot 10^{-7} K^{-1}$, or indeed less than $20 \cdot 10^{-7} K^{-1}$. When present in too great a quantity, it gives rise to unacceptable devitrification. In preferred manner, its content lies in the range 1% to 4%, and in very preferred manner in the range 3% to 4%.

$TiO_2$ (1% to 5%) and $ZrO_2$ (0 to 2%): $ZrO_2$ is opportunely (but not compulsorily) present. In reference to its efficiency, when it is present, it has generally to be present at levels of at least 0.1%. Otherwise stated, $ZrO_2$ is "not present" or is efficiently present, generally at a level in the range 0.1 to 2%. These elements, $TiO_2$ and $ZrO_2$, enable the glass to nucleate and enable a transparent glass-ceramic to be formed. The joint presence of these two elements makes it possible to optimize nucleation. Too great a content of $TiO_2$ makes it difficult to obtain a transparent glass-ceramic. $TiO_2$ is advantageously present at a content lying in the range 2% to 4%. Too great a content of $ZrO_2$ leads to unacceptable devitrification. $ZrO_2$ is advantageously present at a content lying in the range 0.5% to 2%, very advantageously it is present at a content lying in the range 1% to 2%.

BaO (0 to 4%), SrO (0 to 4%), CaO (0 to 1%), $Na_2O$ (0 to 1%), and $K_2O$ (0 to 1%): these elements are optionally present. To have an effect, each of said elements, when it is present, is generally present at levels of at least 100 ppm. Otherwise stated, BaO is "not present" or is efficiently present, generally at a level in the range 0.01 to 4%; SrO is "not present" or is efficiently present, generally at a level in the range 0.01 to 4% (see however later); CaO is "not present" or is efficiently present, generally at a level in the range 0.01 to 1%; $Na_2O$ is "not present" or is efficiently present, generally at a level in the range 0.01 to 1%; and $K_2O$ is "not present" or is efficiently present, generally at a level in the range 0.01 to 1%. These elements remain in the residual glass after crystallization. They reduce the viscosity of the glass at high temperature, they facilitate dissolution of the $ZrO_2$ (when it is present) and they limit devitrification into mullite, but they also increase the CTE of the glass-ceramics. That is why the sum of these elements must be equal to or less than 6%. It may be observed that SrO is generally not present as an added raw material, given that it is an expensive material. In such a context (SrO not present as added raw material), if SrO is present, it is only present as inevitable traces (<100 ppm), brought in as an impurity with at least one of the raw materials used or in the cullet used.

Fining agents: the composition of the glass-ceramics advantageously includes at least one fining agent comprising $SnO_2$. When present, said at least one fining agent is present at an effective quantity (for performing chemical fining), which conventionally does not exceed 2% by weight. It is thus generally present in the range 0.05% to 2% by weight.

In a particularly opportune manner, for environmental reasons, fining is obtained by using $SnO_2$—generally with 0.05% to 0.6% by weight of $SnO_2$, and more particularly with 0.15% to 0.4% by weight of $SnO_2$—within the composition of the glass-ceramics of the present application which contains neither $As_2O_3$ nor $Sb_2O_3$, or which contains only inevitable traces of at least one of these toxic compounds ($As_2O_3+Sb_2O_3$<1000 ppm). If traces of at least one of these compounds are present, they are present as contamination; by way of example, this may be due to the presence of recycled materials of the cullet type (derived from old glass-ceramics fined with these compounds) in the charge of raw materials able to vitrify. Under such circumstances, the co-presence of at least one other fining agent, such as $CeO_2$, a chloride, and/or a fluoride is not excluded but, preferably, $SnO_2$ is present as the single fining agent.

It should be observed that the absence of an effective quantity of chemical fining agent(s), or indeed the absence of any chemical fining agent, is not completely to be excluded; fining can then be performed thermally. This non-excluded variant is nevertheless not preferred in any way.

Coloring agents: the composition of the glass-ceramics advantageously includes at least one coloring agent. Ii is above mentioned that in the context of cooktops, it is appropriate to mask elements that are arranged under said cooktops. Said at least one coloring agent is present in an effective amount (generally at at least 0.01% by weight), it is conventionally present at levels of at most 2% by weight, or indeed at levels of at most 1% by weight. Said at least one coloring agent is conventionally selected from oxides of transition elements (e.g., $V_2O_5$, CoO, $Cr_2O_3$, $Fe_2O_3$ (see below), NiO, . . . ) and of rare earths (e.g., $Nd_2O_3$, $Er_2O_3$, . . . ). In preferred manner, vanadium oxide $V_2O_5$ is used since said vanadium oxide leads to low absorption in the glass, which is advantageous for melting. The absorption, it makes possible, is generated during the ceramming treatment (during which it is partially reduced). It is particularly advantageous to combine $V_2O_5$ with other coloring agents such as $Cr_2O_3$, CoO, or $Fe_2O_3$ (see below), since that enables transmission to be modulated. The inventors have observed that by reducing the $Li_2O$ content, smaller quantities of $V_2O_5$ are needed for obtaining the same coloring, which is also advantageous from a cost point of view (since $V_2O_5$ is an element that is quite expensive). With reference to the requirements set out below (formulated for the utilization thickness, typically in the range 1 mm to 8 mm, more generally in the range 2 mm to 5 mm, and often 4 mm):

to have an integrated transmission (TL) less than 10%, preferably less than 4%;
while maintaining transmission:
+ at 625 nanometers (nm) ($T_{625\ nm}$) greater than 1%, thus making it possible to pass light, for display purposes, from an LED emitting in the red and placed under the plate (cooktop),
+ at 950 nanometers (nm) ($T_{950\ nm}$) lying in the range 50 to 75%, thus enabling infra-red electronic touch controls to be used, which emit and receive at said wavelength,
the combination (weight % relative to the total composition) of coloring agents as set out below has been found to be particularly advantageous:

| | |
|---|---|
| $V_2O_5$ | 0.005% to 0.1% |
| $Fe_2O_3$ | 0.01% to 0.32% |
| $Cr_2O_3$ | 0 to 0.1% |
| CoO | 0 to 0.1%. |

Among the coloring agents, $Fe_2O_3$ has a special place. It has an effect on color and it is actually often present, in a less or more important amount, as an impurity (e.g. coming from the raw materials). It is however not excluded to add some $Fe_2O_3$ to adjust the color. Its acceptable presence "in large quantity" in the composition of glass-ceramics of the present application makes it possible to use raw materials that are less pure and thus often less expensive.

The above-identified ingredients involved, or potentially involved, in the composition of glass-ceramics of the present application ($SiO_2$, $Al_2O_3$, $Li_2O$, MgO, ZnO, $TiO_2$, $ZrO_2$, BaO, SrO, CaO, $Na_2O$, $K_2O$, fining agent(s) (comprising $SnO_2$), and coloring agent(s)) can indeed represent 100% by weight of the composition of glass-ceramics of the present application, but, a priori; the presence of at least one other compound is not to be totally excluded, providing it is at low quantity (generally less than or equal to 3% by weight) and does not substantially affect the properties of the glass-ceramics. In particular, the following compounds may be present, at a total content of less than or equal to 3% by weight, each of them being present at a total content less than or equal to 2% by weight: $P_2O_5$, $B_2O_3$, $Nb_2O_5$, $Ta_2O_5$, $WO_3$, and $MoO_3$.

The above-identified ingredients involved, or potentially involved, in the composition of glass-ceramics of the present application ($SiO_2$, $Al_2O_3$, $Li_2O$, MgO, ZnO, $TiO_2$, $ZrO_2$, BaO, SrO, CaO, $Na_2O$, $K_2O$, fining agent(s) (comprising $SnO_2$), and coloring agent(s)), thus represent at least 97% by weight, or indeed at least 98% by weight, or indeed at least 99% by weight, or even 100% by weight (see above) of the composition of glass-ceramics of the present application.

The glass-ceramics of the present application thus contain $SiO_2$, $Al_2O_3$, $Li_2O$, ZnO, and MgO as essential ingredients for the solid solution of (β-quartz (see below). This solid solution of β-quartz represents the main crystalline phase. This solid solution of β-quartz generally represents more than 80% by weight of the total crystallized fraction. It generally represents more than 90% by weight of said total crystallized fraction. The size of the crystals is small (typically less than 70 nm), which enables the glass-ceramics to be transparent (integrated transmission ≥1% and diffusion <2%).

Glass-ceramics of the present application contain about 10% to about 40% by weight of residual glass.

In a second aspect, the present application provides articles that are constituted at least in part of a glass-ceramic of the present application as described above. Said articles are optionally constituted in full out of a glass-ceramic of the present application. Said articles advantageously consist of cooktops, which are a priori bulk colored (see above). Nevertheless, that is not the only application for which they can be used. In particular, they also may constitute the material constituting cooking utensils, microwave oven plates, oven doors, whether colored or not. It will naturally be understood that the glass-ceramics of the present application are logically used in contexts that are compatible with their CTEs. Thus, cooktops are strongly recommended for use with induction heating means, particularly with induction heating means associated with infrared sensors.

In a third aspect, the present application provides aluminosilicate glasses that are precursors for the glass-ceramics of the present application, as described above. In characteristic manner, said glasses present a composition that makes it possible to obtain said glass-ceramics. Said glasses generally present a composition corresponding to that of said glass-ceramics, but the correspondence is not necessarily complete insofar as the person skilled in the art readily understands that the heat treatments applied to such glasses for obtaining glass-ceramics are likely to have some effect on the composition of the material. The glasses of the present application are obtained in conventional manner by melting a charge of raw materials able to vitrify (raw materials making them up being present in the appropriate proportions). Nevertheless, it can be understood (and will not surprise the person skilled in the art) that the charge in question may contain cullet. Said glasses are particularly interesting in that:

they have advantageous devitrification properties, in particular compatible with using forming methods involving rolling, floating, and pressing. Said glasses present a low liquidus temperature (<1400° C.), and a high viscosity at liquidus (>200 Pa·s, indeed >400 Pa·s, preferably >500 Pa·s); and/or, advantageously, and they have a low viscosity at high temperature ($T_{30\ Pa\cdot s}$<1640° C.).

In other respects, it has to be noted that it is possible to obtain (from said precursor glasses) the glass-ceramics of the present application by performing ceramming (crystallization) thermal cycling of short duration (less than 3 h), preferably of very short duration (less than 1 h); and that the resistivity of said precursor glasses is low (resistivity less than 50 Ω·cm, preferably less than 20 Ω·cm, at a viscosity of 30 Pa·s).

The low liquidus temperature, the high viscosity at liquidus, and the low viscosity at high temperature (see above) are particularly important.

In its last aspect, the present application provides a method of preparing an article constituted at least in part of a glass-ceramic of the present application, as described above.

Said method is a method by analogy.

In conventional manner, said method comprises heat treatment of a charge of raw materials able to vitrify (it being understood that such a charge able to vitrify may contain cullet (see above)) under conditions that ensure melting and fining in succession, followed by shaping the fined molten precursor glass (said shaping possibly being performed by rolling, by pressing, or by floating), followed by ceramming (or crystallization) heat treatment of the shaped fined molten precursor glass. The ceramming heat treatment generally comprises two steps: a nucleation step and another step of growing crystals of the solid solution of β-quartz. Nucleation generally takes place in the temperature range 650° C. to 830° C. and crystal growth in the temperature range 850° C. to 950° C. Concerning the duration of each of these steps, mention may be made in entirely non-limiting manner of about 5 minutes (min) to 60 min for nucleation and about 5 min to 30 min for growth of crystals. The person skilled in the art knows how to optimize the temperatures and the durations of these two steps as a function of the composition of the precursor glasses, in reference more particularly to the aimed transparency.

Said method of preparing an article, constituted at least in part of a glass-ceramic of the present application thus comprises in succession:
  melting a charge of raw materials able to vitrify, followed by fining the resulting molten glass;
  cooling the resulting fined molten glass and simultaneously shaping it to the shape desired for the intended article; and
  applying ceramming heat treatment to said shaped glass.

The two successive steps of obtaining a shaped fined glass (precursor of the glass-ceramic) and ceramming said shaped fined glass may be performed immediately one after the other, or they may be spaced apart in time (on a single site or on different sites).

In characteristic manner, the charge of raw materials able to vitrify has a composition that makes it possible to obtain a glass-ceramic of the present application, thus having the composition by weight as specified above (advantageously including $SnO_2$ as a fining agent (in the absence of $As_2O_3$ and $Sb_2O_3$), preferably as the single fining agent). The ceramming performed on the glass obtained from such a charge is entirely conventional. It is mentioned above that said ceramming may be obtained in a short length of time (<3 h), or indeed in a very short length of time (<1 h).

In the context of preparing an article, such as a cooktop, the precursor glass is cut after being shaped and prior to being subjected to the ceramming treatment (ceramming cycle). It is generally also edged, rounded shaped and decorated. Such forming and decorating steps may be performed before or after the ceramming heat treatment. By way of example, the decorating may be performed by screen-printing.

The present application is illustrated below by the following examples and comparative examples.

EXAMPLES

To produce batches of 1 kilogram (kg) of precursor glass, the raw materials, in the proportions specified in the first portion of the table below (proportions expressed by (weight % of) oxides) (which table is spread over several pages), were mixed together carefully.

The mixtures were placed for melting in crucibles made of platinum. The crucibles containing said mixtures were then placed in a oven preheated to 1550° C. They were subjected therein to a melting cycle of the following type:
  temperature rise from 1550° C. to 1670° C. in 1 h;
  temperature maintained at 1670° C. for 5 h 30.

The crucibles were then extracted from the oven and the molten glass was poured onto a preheated steel plate. It was rolled on the plate to a thickness of 6 mm. Glass plates were thus obtained. They were annealed at 650° C. for 1 h and subsequently cooled down slowly.

The properties of the resulting glasses are given in the second portion of the table below.

Viscosities were measured using a rotational viscosimeter (Gero).

$T_{30\ Pa \cdot s}$ (° C.) corresponds to the temperature at which the viscosity of the glass was 30 Pa·s.

The resistivity of the glass was measured at high temperature, on a thickness of 1 centimeter (cm) of molten glass, using a 4-point contact RLC bridge. The table gives the resistivity measured at the temperature at which the viscosity was 30 Pa·s.

$T_{liq}$ (° C.) is the liquidus temperature. The liquidus is given by a range of associated temperatures and viscosities: the highest temperature corresponds to the minimum temperature at which no crystal was observed, the lowest temperature corresponds to the maximum temperature at which crystals were observed.

The devitrification characteristics were determined as follows. 0.5 cubic centimeter ($cm^3$) samples of glass were subjected to the following heat treatment:
  placing in a oven preheated to 1430° C.;
  maintaining this temperature for 30 min;
  lowering to the test temperature, T, at a rate of 10° C./min;
  maintaining this temperature for 17 h; and
  quenching the samples.

The crystals present, if any, were observed by optical microscopy.

The ceramming cycle performed was as follows:
  rapid temperature rise up to 500° C.;
  temperature rise from 500° C. to 650° C. at a heating rate of 23° C./min;
  temperature rise from 650° C. to 820° C. at a heating rate of 6.7° C./min;
  temperature rise from 820° C. to the maximum temperature Tmax (specified in the table) at a rate of 15° C./min;
  maintaining this temperature Tmax for 7 min (in all of the examples except example 18 (comparative example, see below) with the ceramming treatment Ceram 1);
  cooling down to 850° C. at 35° C./min; and
  cooling down to ambient temperature as a function of the inertia of the oven.

For certain examples (examples 1, 2, 4, 18 and 20) the results are given as obtained at the end of two different ceramming treatments (Ceram 1 and Ceram 2, which differ in the value of their Tmax).

The ceramming cycle Ceram 1 of example 18 (Tmax=830° C.) does not actually correspond to the "general" ceramming cycle specified above. It was as follows:
- temperature rise up to 710° C. at a heating rate of 22.5° C./min;
- temperature maintained at 710° C. for 60 min;
- temperature rise from 710° C. to 830° C. at a heating rate of 24° C./min;
- temperature maintained at 830° C. for 30 min; and
- cooling to ambient temperature as a function of the inertia of the oven.

The properties of the glass-ceramics obtained are given in the last portion of Table 1 below.

These glass-ceramics contain a solid solution of β-quartz as the main crystalline phase (as verified by X-ray diffraction) (with the exception of that of comparative example 16). Thus, the glass-ceramics of examples 5 and 6 respectively contain 96% and 95% (wt. %) of solid solution of β-quartz phase (relative to the total crystallized fraction) and the mean sizes of their β-quartz crystals respectively were 46 nm and 43 nm. The percentage of β-quartz solid solution and the mean sizes of the crystals were determined by the Rietveld method.

The CTE (coefficients of thermal expansion (from ambient temperature (25° C.) to 300° C. ($CTE_{25\text{-}300°\ C.}$) were measured on bar-shaped glass-ceramic samples with a high-temperature dilatometer (DIL 402C, Netzsch) at a heating rate of 3° C./min.

The aspect of the samples (transparency, color) is given in the table.

For some samples, total and diffuse transmission measurements were carried out at 4 mm using a Varian spectrophotometer (model Cary 500 Scan), fitted with an integrating sphere. On the basis of these measurements, the integrated transmission (TL (%)) in the visible range (between 380 and 780 nm) and the diffusion percentage (Diffusion (%)) were calculated in application of the standard ASTM D 1003-13 (with D65 illuminant and 2° observer). Transmission values (at 625 nm ($T_{625\ nm}$), at 950 nm ($T_{950\ nm}$)) are also specified for some samples.

Examples 1 to 14 in the table illustrate the present application. Examples 1 to 4 are preferred because of the values for the liquidus viscosity of the precursor glasses.

Examples 15 to 21 (of the table) are comparative examples.

In example 15, the $Al_2O_3$ content is too high (21.48%>21%) and the observed devitrification of the glass is unacceptable (said glass does not have the required properties).

In example 16, the $Li_2O$ and $Al_2O_3$ contents are too small and the $Na_2O+K_2O+BaO+CaO$ content is too large. Only a small quantity of crystals formed during the heat treatment and they were spinel crystals and not a solid solution of β-quartz. Consequently, the CTE after ceramming was too high.

In example 17, the $Li_2O$, $Al_2O_3$, and ZnO contents are too large, the $SiO_2$ content is too small. Consequently, the glass possesses devitrification characteristics that are unacceptable.

In example 18, the MgO content is too large, and consequently the CTE of the glass-ceramics is too high.

In example 19, the MgO content is too small and the ZnO content is large. Consequently, the liquidus temperature is very high and the viscosity at the liquidus is too low (the glass does not have the required properties).

In example 20, the ZnO content is too small and the MgO content is high. Consequently, the CTE of the glass-ceramic is too high or the glass-ceramic shows optical properties that are unacceptable.

In example 21, the ZnO content is too high. Consequently, the high-temperature viscosity of the glass is very low and the liquidus temperature is high, so the viscosity at the liquidus is too small (the glass does not have the required properties).

TABLE

| Examples (wt %) | 1 | 2 | 3 | 4 | 5 |
|---|---|---|---|---|---|
| $SiO_2$ | 66.71 | 66.61 | 66.51 | 65.97 | 64.10 |
| $Al_2O_3$ | 18.10 | 18.10 | 18.10 | 18.89 | 19.72 |
| $Li_2O$ | 1.63 | 1.63 | 1.63 | 1.62 | 1.86 |
| MgO | 2.17 | 2.17 | 2.17 | 2.16 | 2.47 |
| ZnO | 3.08 | 3.08 | 3.08 | 3.07 | 3.56 |
| BaO | 2.47 | 2.47 | 2.47 | 2.46 | 2.46 |
| CaO | 0.44 | 0.44 | 0.44 | 0.44 | 0.44 |
| $TiO_2$ | 2.99 | 2.80 | 2.62 | 2.98 | 2.98 |
| $ZrO_2$ | 1.33 | 1.62 | 1.90 | 1.33 | 1.33 |
| $Na_2O$ | 0.61 | 0.61 | 0.61 | 0.61 | 0.61 |
| $K_2O$ | | | | | |
| $SnO_2$ | 0.30 | 0.30 | 0.30 | 0.30 | 0.30 |
| $Fe_2O_3$ | 0.12 | 0.12 | 0.12 | 0.12 | 0.12 |
| $V_2O_5$ | 0.03 | 0.03 | 0.03 | 0.03 | 0.03 |
| $Cr_2O_3$ | 0.02 | 0.02 | 0.02 | 0.02 | 0.02 |
| CoO | | | | | |
| $Na_2O + K_2O + BaO + CaO + SrO$ | 3.53 | 3.53 | 3.53 | 3.51 | 3.51 |
| $T_{30\ Pa \cdot s}$ (° C.) | 1636 | 1621 | 1619 | 1628 | 1571 |
| $T_{liq}$ (° C.) | 1350-1366 | 1338-1350 | 1350-1366 | 1350-1360 | 1350-1372 |
| Viscosity at $T_{liq}$ (Pa · s) | 600-800 | 700-850 | 500-650 | 600-700 | 300-450 |
| Crystalline phase that devitrifies at the liquidus temperature | spinel | zircon + spinel | zircon | spinel | spinel |
| Resistivity at 30 Pa · s (Ω · cm) | 8.4 | 9.4 | 9.9 | 8.8 | 7.9 |

TABLE-continued

| Ceram 1 | | | | | |
|---|---|---|---|---|---|
| Tmax (° C.) | 890 | 900 | 890 | 880 | 880 |
| Aspect | transparent colored | transparent colored | transparent colored | transparent colored | transparent colored |
| $CTE_{25-300° C.}$ ($\times 10^{-7} K^{-1}$) | 18.4 | 17.6 | 19.7 | 20 | 17.5 |
| Ceram 2 | | | | | |
| Tmax (° C.) | 920 | 920 | | 920 | |
| Aspect | transparent colored | transparent colored | | transparent colored | |
| $CTE_{25-300° C.}$ ($\times 10^{-7} K^{-1}$) | 17.5 | 16.3 | | 18.3 | |
| TL (%) | 1 | 3 | | | |
| Diffusion (%) | 1.5 | 1 | | | |
| $T_{625 nm}$ (%) | 3.1 | 8.3 | | | |
| $T_{950 nm}$ (%) | 58 | 64 | | | |

| Examples (wt %) | 6 | 7 | 8 | 9 |
|---|---|---|---|---|
| $SiO_2$ | 63.70 | 65.34 | 65.65 | 65.45 |
| $Al_2O_3$ | 19.60 | 19.67 | 19.79 | 17.99 |
| $Li_2O$ | 1.84 | 1.62 | 1.63 | 1.62 |
| MgO | 1.85 | 2.15 | 2.78 | 2.15 |
| ZnO | 4.77 | 3.06 | 1.84 | 3.06 |
| BaO | 2.45 | 2.46 | 2.47 | 3.48 |
| CaO | 0.44 | 0.44 | 0.44 | 0.63 |
| $TiO_2$ | 2.96 | 2.97 | 2.99 | 2.97 |
| $ZrO_2$ | 1.32 | 1.32 | 1.33 | 1.32 |
| $Na_2O$ | 0.61 | 0.61 | 0.61 | 0.86 |
| $K_2O$ | | | | |
| $SnO_2$ | 0.29 | 0.30 | 0.30 | 0.30 |
| $Fe_2O_3$ | 0.12 | 0.01 | 0.12 | 0.12 |
| $V_2O_5$ | 0.03 | 0.03 | 0.03 | 0.03 |
| $Cr_2O_3$ | 0.02 | 0.02 | 0.02 | 0.02 |
| CoO | | | | |
| $Na_2O + K_2O + BaO + CaO + SrO$ | 3.50 | 3.51 | 3.53 | 4.97 |
| $T_{30 Pa \cdot s}$ (° C.) | 1584 | 1621 | 1604 | 1632 |
| $T_{liq}$ (° C.) | 1370-1387 | 1350-1373 | 1350-1367 | |
| Viscosity at $T_{liq}$ (Pa · s) | 250-350 | 500-700 | 500-600 | |
| Crystalline phase that devitrifies at the liquidus temperature | spinel | mullite + spinel | mullite | |
| Resistivity at 30 Pa · s (Ω · cm) | 8.1 | 7.8 | 9.9 | |
| Ceram 1 | | | | |
| Tmax (° C.) | 880 | 880 | 890 | 920 |
| Aspect | transparent colored | transparent colored | transparent colored | transparent colored |
| $CTE_{25-300° C.}$ ($\times 10^{-7} K^{-1}$) | 15.8 | 21.3 | 22.4 | 20.2 |
| Ceram 2 | | | | |
| Tmax (° C.) | | | | |
| Aspect | | | | |
| $CTE_{25-300° C.}$ ($\times 10^{-7} K^{-1}$) | | | | |
| TL (%) | | | | |
| Diffusion (%) | | | | |

| Examples (wt %) | 10 | 11 | 12 | 13 | 14 |
|---|---|---|---|---|---|
| $SiO_2$ | 66.14 | 67.57 | 67.85 | 63.86 | 63.86 |
| $Al_2O_3$ | 18.10 | 18.98 | 18.87 | 19.00 | 19.00 |
| $Li_2O$ | 1.63 | 1.28 | 1.84 | 1.84 | 1.84 |
| MgO | 2.17 | 2.49 | 1.75 | 1.75 | 1.75 |
| ZnO | 3.08 | 4.94 | 4.95 | 4.95 | 4.95 |
| BaO | 2.47 | 0.00 | 0.00 | 2.50 | 2.50 |
| CaO | 0.44 | 0.00 | 0.00 | 0.44 | 0.44 |
| $TiO_2$ | 2.99 | 2.62 | 2.63 | 3.02 | 2.62 |
| $ZrO_2$ | 1.90 | 1.75 | 1.75 | 1.35 | 1.75 |
| $Na_2O$ | 0.61 | 0.00 | 0.00 | 0.62 | 0.62 |
| $K_2O$ | | | | 0.25 | 0.25 |
| $SnO_2$ | 0.30 | 0.30 | 0.30 | 0.28 | 0.28 |
| $Fe_2O_3$ | 0.12 | 0.03 | 0.03 | 0.09 | 0.09 |
| $V_2O_5$ | 0.03 | 0.04 | 0.03 | 0.03 | 0.03 |

TABLE-continued

|  |  |  |  |  |  |
|---|---|---|---|---|---|
| $Cr_2O_3$ | 0.02 | 0.00 | 0.00 | 0.00 | 0.00 |
| CoO |  |  |  | 0.02 | 0.02 |
| $Na_2O + K_2O + BaO + SrO + CaO$ | 3.53 | 0.00 | 0.00 | 3.81 | 3.81 |
| $T_{30\ Pa \cdot s}$ (°C.) | 1635 | 1610 | 1617 |  | 1581 |
| $T_{liq}$ (°C.) | 1350-1366 | 1350-1375 | 1350-1375 | 1328-1353 | 1325-1355 |
| Viscosity at $T_{liq}$ (Pa·s) | 600-750 | 450-650 | 450-650 |  | 450-700 |
| Crystalline phase that devitrifies at the liquidus temperature | zircon + spinel | mullite + spinel | zircon + spinel |  |  |
| Resistivity at 30 Pa·s (Ω·cm) | 8.3 | 12 | 7.8 |  |  |
| Ceram 1 |  |  |  |  |  |
| Tmax (°C.) | 890 | 975 | 975 | 880 | 855 |
| Aspect | transparent colored | transparent colored | transparent colored | transparent colored | transparent colored |
| $CTE_{25-300°\ C.}$ (×10$^{-7}$ K$^{-1}$) | 24.7 | 18.1 | 7.8 | 13 | 12.9 |
| Ceram 2 |  |  |  |  |  |
| Tmax (°C.) |  |  |  |  |  |
| Aspect |  |  |  |  |  |
| $CTE_{25-300°\ C.}$ (×10$^{-7}$ K$^{-1}$) |  |  |  |  |  |
| TL (%) |  |  |  |  |  |
| Diffusion (%) |  |  |  |  |  |

| Comparative examples (wt %) | 15 | 16 | 17 | 18 |
|---|---|---|---|---|
| $SiO_2$ | 63.55 | 65.81 | 54.21 | 63.03 |
| $Al_2O_3$ | 21.48 | 14.57 | 25.50 | 20.00 |
| $Li_2O$ | 1.60 | 0.49 | 2.70 | 1.84 |
| MgO | 2.13 | 1.33 | 1.00 | 4.95 |
| ZnO | 3.04 | 4.70 | 7.70 | 1.75 |
| BaO | 2.44 | 6.24 | 1.00 | 2.50 |
| CaO | 0.44 | 0.99 | 1.30 | 0.45 |
| $TiO_2$ | 2.95 | 2.89 | 4.10 | 3.02 |
| $ZrO_2$ | 1.31 | 1.28 | 2.00 | 1.35 |
| $Na_2O$ | 0.60 | 1.01 |  | 0.62 |
| $K_2O$ |  | 0.21 |  |  |
| $SnO_2$ | 0.29 | 0.29 | 0.30 | 0.30 |
| $Fe_2O_3$ | 0.12 | 0.13 | 0.13 | 0.13 |
| $V_2O_5$ | 0.03 | 0.04 | 0.04 | 0.04 |
| $Cr_2O_3$ | 0.02 | 0.02 | 0.02 | 0.02 |
| CoO |  |  |  |  |
| $Na_2O + K_2O + BaO + SrO + CaO$ | 3.48 | 8.45 | 2.30 | 3.57 |
| $T_{30\ Pa \cdot s}$ (°C.) | 1587 | 1705 | 1421 |  |
| $T_{liq}$ (°C.) | >1400 |  | >1370 |  |
| Viscosity at $T_{liq}$ (Pa·s) | <200 |  | <100 |  |
| Crystalline phase that devitrifies at the liquidus temperature | mullite |  |  |  |
| Resistivity at 30 Pa·s (Ω·cm) | 10.5 | 22.3 | 7.6 |  |
| Ceram 1 |  |  |  |  |
| Tmax (°C.) |  | 930 | 920 | 830 |
| Aspect |  | transparent colored | transparent colored | transparent colored |
| $CTE_{25-300°\ C.}$ (×10$^{-7}$ K$^{-1}$) |  | 38.1 | 14.9 | 25.8 |
| Ceram 2 |  |  |  |  |
| Tmax (°C.) |  |  |  | 850 |
| Aspect |  |  |  | opalescent |
| $CTE_{25-300°\ C.}$ (×10$^{-7}$ K$^{-1}$) |  |  |  |  |
| TL (%) |  |  |  |  |
| Diffusion (%) |  |  |  |  |

| Comparative Examples (wt %) | 19 | 20 | 21 |
|---|---|---|---|
| $SiO_2$ | 62.31 | 66.78 | 62.17 |
| $Al_2O_3$ | 19.93 | 18.13 | 18.33 |
| $Li_2O$ | 1.80 | 1.63 | 1.51 |
| MgO | 0.47 | 2.91 | 1.83 |

TABLE-continued

| | | | |
|---|---|---|---|
| ZnO | 5.86 | 0.49 | 6.90 |
| BaO | 3.53 | 3.53 | 2.42 |
| CaO | 0.64 | 0.53 | 0.44 |
| $TiO_2$ | 2.90 | 3.00 | 3.28 |
| $ZrO_2$ | 1.29 | 1.34 | 1.84 |
| $Na_2O$ | 0.59 | 0.95 | 0.60 |
| $K_2O$ | 0.21 | 0.22 | 0.21 |
| $SnO_2$ | 0.29 | 0.30 | 0.29 |
| $Fe_2O_3$ | 0.12 | 0.13 | 0.12 |
| $V_2O_5$ | 0.04 | 0.04 | 0.04 |
| $Cr_2O_3$ | 0.02 | 0.02 | 0.02 |
| CoO | | | |
| $Na_2O + K_2O + BaO + SrO + CaO$ | 4.97 | 5.23 | 3.68 |
| $T_{30\,Pa \cdot s}$ (° C.) | 1580 | 1658 | 1561 |
| $T_{liq}$ (° C.) | 1402-1415 | | 1386-1402 |
| Viscosity at $T_{liq}$ (Pa · s) | 170-210 | | 160-200 |
| Crystalline phase that devitrifies at the liquidus temperature | spinel | | spinel |
| Resistivity at 30 Pa · s (Ω · cm) | 9.7 | 7.2 | 9.3 |
| Ceram 1 | | | |
| Tmax (° C.) | | 890 | |
| Aspect | | transparent colored | |
| $CTE_{25-300°\,C.}$ $(\times 10^{-7}\,K^{-1})$ | | 30.2 | |
| Ceram 2 | | | |
| Tmax (° C.) | | 920 | |
| Aspect | | opalescent colored | |
| $CTE_{25-300°\,C.}$ $(\times 10^{-7}\,K^{-1})$ | | 24.8 | |
| TL (%) | | 0.3 | |
| Diffusion (%) | | 8 | |
| $T_{625\,nm}$ (%) | | 1.2 | |

The invention claimed is:

1. A transparent glass-ceramic containing a solid solution of β-quartz as its main crystalline phase, the composition of which, free of arsenic oxide and antimony oxide, except for inevitable traces, expressed as percentages by weight of oxides, comprises:

62% to 68% of $SiO_2$;
17% to 21% of $Al_2O_3$;
1% to <2% of $Li_2O$;
1% to 4% of MgO;
1% to 6% of ZnO;
0 to 4% of BaO;
0 to 4% of SrO;
0 to 1% of CaO;
1% to 5% of $TiO_2$;
0 to 2% of $ZrO_2$;
0 to 1% of $Na_2O$;
0 to 1% of $K_2O$;
with $Na_2O+K_2O+BaO+SrO+CaO \le 6\%$;
optionally up to 2% of at least one fining agent comprising $SnO_2$; and
0.01% to 2% of at least one coloring agent, wherein the coloring agent comprises 0.005% to 0.1% $V_2O_5$ mixed with at least one other coloring agent selected from CoO, $Cr_2O_3$, and $Fe_2O_3$;
wherein the transparent glass ceramic comprises a coefficient of thermal expansion $CTE_{25°\,C.-300°\,C.}$ of less than $20 \cdot 10^{-7} K^{-1}$; and
the transparent glass ceramic has a thickness from 1 mm to 8 mm and an integrated transmission of less than 10% while maintaining transmission at 625 nm greater than 1% and at 950 nm from 50% to 75%.

2. The glass-ceramic according to claim 1, wherein the composition comprises 1% to 1.9% of $Li_2O$.

3. The glass-ceramic according to claim 1, wherein the composition comprises 17.5% to 19% of $Al_2O_3$.

4. The glass-ceramic according to claim 1 wherein the composition comprises 1% to 3% of MgO.

5. The glass-ceramic according to claim 1, wherein the composition comprises 1% to 4% of ZnO.

6. The glass-ceramic according to claim 1, wherein the composition comprises $ZrO_2$.

7. The glass-ceramic according to claim 1, wherein the composition comprises 0.05% to 0.6% of $SnO_2$.

8. An article constituted, at least in part, of a glass-ceramic according to claim 1.

9. A method of preparing an article constituted, at least in part, of a glass-ceramic containing a solid solution of β-quartz as its main crystalline phase, comprising in succession:

melting a charge of raw materials able to vitrify, followed by fining the resulting molten glass;
cooling the resulting fined molten glass and simultaneously shaping it to the shape desired for the intended article; and
applying ceramming heat treatment to said shaped glass;
wherein said charge has a composition that makes it possible to obtain the transparent glass-ceramic, the composition of which, free of arsenic oxide and antimony oxide, except for inevitable traces, expressed as percentages by weight of oxides, comprises:

62% to 68% of $SiO_2$;
17% to 21% of $Al_2O_3$;
1% to <2% of $Li_2O$;
1% to 4% of MgO;
1% to 6% of ZnO;
0 to 4% of BaO;
0 to 4% of SrO;
0 to 1% of CaO;
1% to 5% of $TiO_2$;
0 to 2% of $ZrO_2$;
0 to 1% of $Na_2O$;
0 to 1% of $K_2O$;
with $Na_2O+K_2O+BaO+SrO+CaO \leq 6\%$;
0 to 2% of at least one fining agent comprising $SnO_2$; and
0.01% to 2% of at least one coloring agent, wherein the coloring agent comprises 0.005% to 0.1% $V_2O_5$ mixed with at least one other coloring agent selected from CoO, $Cr_2O_3$, and $Fe_2O_3$,
wherein the transparent glass ceramic comprises a coefficient of thermal expansion $CTE_{25° C.\text{-}300° C.}$ of less than $20 \cdot 10^{-7} K^{-1}$, the transparent glass ceramic having a thickness from 1 mm to 8 mm and an integrated transmission of less than 10% while maintaining transmission at 625 nm greater than 1% and at 950 nm from 50% to 75%.

10. The method according to claim 9, wherein said charge of raw materials able to vitrify, free of $As_2O_3$ and $Sb_2O_3$, except for inevitable traces, contains $SnO_2$ as fining agent.

11. The method of claim 10, wherein the charge of raw materials able to vitrify, free of $As_2O_3$ and $Sb_2O_3$, except for inevitable traces, comprises 0.05% to 0.6% of $SnO_2$.

12. The glass-ceramic according to claim 2, wherein the composition comprises 1.5% to 1.9% of $Li_2O$.

13. The glass-ceramic of claim 5, wherein the composition comprises 3% to 4% of ZnO.

14. The glass-ceramic according to claim 6, wherein the composition 0.5% to 2% of $ZrO_2$.

15. The glass-ceramic according to claim 6, wherein the composition 1% to 2% of $ZrO_2$.

16. The glass-ceramic according to claim 7, wherein the composition comprises 0.15% to 0.4% of $SnO_2$.

* * * * *

UNITED STATES PATENT AND TRADEMARK OFFICE
CERTIFICATE OF CORRECTION

| | | |
|---|---|---|
| PATENT NO. | : 11,352,290 B2 | Page 1 of 1 |
| APPLICATION NO. | : 16/620307 | |
| DATED | : June 7, 2022 | |
| INVENTOR(S) | : Marie Comte et al. | |

It is certified that error appears in the above-identified patent and that said Letters Patent is hereby corrected as shown below:

On the Title Page

In item (57), in Column 2, in "Abstract", Line 9, delete "AI$_2$O$_3$;" and insert -- Al$_2$O$_3$; --.

In the Claims

In Column 20, Line 16, in Claim 14, delete "composition 0.5%" and insert -- composition comprises 0.5% --.

In Column 20, Line 18, in Claim 15, delete "composition 1%" and insert -- composition comprises 1% --.

Signed and Sealed this
First Day of August, 2023

Katherine Kelly Vidal
*Director of the United States Patent and Trademark Office*